(12) United States Patent
Gatton, Jr. et al.

(10) Patent No.: US 7,862,789 B2
(45) Date of Patent: Jan. 4, 2011

(54) CIRCULATING FLUIDIZED BED POWER PLANT HAVING INTEGRATED SULFUR DIOXIDE SCRUBBER SYSTEM WITH LIME FEED

(75) Inventors: Lawrence H. Gatton, Jr., Knoxville, TN (US); George D. Mylchreest, Simsbury, CT (US)

(73) Assignee: Alstom Technology Ltd. (CH)

( * ) Notice: Subject to any disclaimer, the term of this patent is extended or adjusted under 35 U.S.C. 154(b) by 0 days.

(21) Appl. No.: 12/196,631

(22) Filed: Aug. 22, 2008

(65) Prior Publication Data

US 2010/0047147 A1 Feb. 25, 2010

(51) Int. Cl.
*B01J 8/24* (2006.01)

(52) U.S. Cl. .................. 423/244.08; 422/139; 422/145; 422/168; 422/169; 422/170; 422/171; 422/172; 422/173

(58) Field of Classification Search ............ 423/244.08; 422/139, 145, 168, 169, 170, 171, 172, 173
See application file for complete search history.

(56) References Cited

U.S. PATENT DOCUMENTS

| | | | | |
|---|---|---|---|---|
| 4,241,041 A | * | 12/1980 | Farin | 423/563 |
| 4,309,393 A | | 1/1982 | Nguyen | |
| 4,388,283 A | * | 6/1983 | Abrams et al. | 423/244.07 |
| 4,668,490 A | * | 5/1987 | van Velzen et al. | 423/243.04 |
| 5,285,629 A | * | 2/1994 | Gounder | 60/39.12 |
| 5,341,753 A | * | 8/1994 | Russell | 122/4 D |
| 5,814,288 A | * | 9/1998 | Madden et al. | 423/244.01 |
| 2002/0037246 A1 | | 3/2002 | Beal et al. | |
| 2004/0060490 A1 | * | 4/2004 | Solis-Martinez | 110/346 |

FOREIGN PATENT DOCUMENTS

| | | |
|---|---|---|
| DE | 35 36 899 A1 | 4/1987 |
| EP | 0 550 905 A1 | 12/1992 |
| EP | 0 882 490 A1 | 12/1998 |
| WO | WO 01/32296 A1 | 5/2001 |
| WO | WO 2004/026443 A1 | 4/2004 |

OTHER PUBLICATIONS

PCT International Search Report and The Written Opinion of the International Searching Authority dated Nov. 26. 2009—(PCT/US2009/054459), Need copy of document.

* cited by examiner

*Primary Examiner*—Timothy C Vanoy
*Assistant Examiner*—Michelle Hou
(74) *Attorney, Agent, or Firm*—Cantor Colburn LLP

(57) ABSTRACT

A circulating fluidized bed power plant 100 includes; a circulating fluidized bed boiler 110 which generates flue gases, a flash dry absorber scrubber 140 configured to receive the flue gases from the circulating fluidized bed boiler 110, and a lime feed 150 configured to introduce lime into the flash dry absorber scrubber 140.

17 Claims, 3 Drawing Sheets

CIRCULATING FLUIDIZED BED POWER PLANT HAVING INTEGRATED SULFUR DIOXIDE SCRUBBER SYSTEM WITH LIME FEED

TECHNICAL FIELD

This application relates generally to integrated sulfur dioxide ("$SO_2$") scrubbers for power plants, and more particularly, to the addition of a lime feed to an integrated $SO_2$ scrubber in a power plant utilizing a circulating fluidized bed ("CFB") boiler.

BACKGROUND

Recently, power plant designs have required the addition of desulphurization systems to meet increasingly stringent regulations on the emission of sulfur dioxide ("$SO_2$"). Power plants may include flash dry absorber ("FDA") scrubbers downstream of a boiler to reduce the emission of $SO_2$. FDA scrubbers are frequently used in power plants employing circulating fluidized bed ("CFB") boilers.

A typical FDA scrubber functions as part of a power plant's particulate collection system; particulate herein being synonymous with flyash, ash or dust, a byproduct of combustion in the boiler. The FDA scrubber may include various particulate collection mechanisms such as a fabric filter, an electrostatic precipitator, etc. The fabric filter may also be referred to as a baghouse.

In operation, flue gases with entrained particulates enter the FDA scrubber via a reactor column. The flue gases pass through the reactor column and into an inlet duct of the FDA scrubber particulate collection mechanism. The flue gases then interact with the particulate collection mechanism wherein the particulates suspended in the flue gases are removed. The removed particulates are then passed through a mixer-hydrator and injected into the reactor column. The recycled and humidified particulates then react with un-filtered flue gases before being re-introduced into the particulate collection mechanism.

Residual calcium oxide ("CaO") in the particulate produced by the boiler functions as a sorbent for $SO_2$ capture. The hydrated particulate including the residual CaO reacts with the flue gases in the reactor column and in the particulate collection mechanism to remove $SO_2$ therefrom.

The use of an FDA scrubber alone may not be adequate to remove enough $SO_2$ to meet today's stringent emission requirements. Typically, an FDA scrubber may be supplemented by other $SO_2$ reduction systems, such as a limestone feed system which introduces limestone into a power plant's boiler. Similar to residual CaO of the particulate mentioned above, the limestone functions as a sorbent for $SO_2$ capture.

While the abovementioned such sulfur dioxide reduction systems have proven effective, they may also be expensive to implement and operate. Costs of such systems include an increase in the amount of fuel used to compensate for a reduced catalytic efficiency due to the introduction of the limestone into the boiler and the cost of the limestone itself. The introduction of limestone to the boiler also results in the catalytic generation of nitrogen oxide ("NOx"). The emission of NOx is also regulated, and may require its own costly removal systems.

Accordingly, a system and method for reducing costs, increasing efficiency, and reducing $SO_x$ and $NO_x$ associated with the use of present sulfur dioxide reduction systems is desired.

SUMMARY

According to the aspects illustrated herein, there is provided a circulating fluidized bed power plant including; a circulating fluidized bed boiler which generates flue gases, a flash dry absorber scrubber configured to receive the flue gases from the circulating fluidized bed boiler; and a lime feed configured to introduce lime into the flash dry absorber scrubber. In one exemplary embodiment the circulating fluidized bed power plant includes a limestone feed configured to introduce limestone to the circulating fluidized bed boiler. In one exemplary embodiment the flash dry absorber includes; a reactor configured to pass the flue gases therethrough, a particulate removal mechanism coupled to the reactor and configured to remove particulate from the flue gases and a mixer configured to receive and hydrate particulate from the particulate removal mechanism and also configured to introduce hydrated particulate into the reactor. In one exemplary embodiment the lime feed is configured to introduce lime into the flash dry absorber upstream of the introduction of the hydrated particulate. In one exemplary embodiment the particulate removal mechanism includes a fabric filter. In one exemplary embodiment the particulate removal mechanism includes an electrostatic precipitator. In one exemplary embodiment the circulating fluidized bed power plant further includes a flash dry absorber scrubber inlet duct disposed between the circulating fluidized bed boiler and the reactor. In one exemplary embodiment the lime feed is configured to introduce lime upstream of the flash dry absorber scrubber inlet duct. In one exemplary embodiment the circulating fluidized bed power plant further includes a particulate removal mechanism inlet duct disposed between the reactor and the particulate removal mechanism. In one exemplary embodiment the reactor is disposed between the flash dry absorber scrubber inlet duct and the particulate removal mechanism inlet duct. In one exemplary embodiment the reactor is a column reactor. In one exemplary embodiment the lime feed includes; a day silo configured to hold the lime and a pneumatic feed receiving lime from the day silo and configured to introduce the lime into the flash dry absorber scrubber.

According to other aspects illustrated herein, a method for reducing sulfur dioxide emission from a circulating fluidized bed power plant, the method including; providing a flash dry absorber scrubber in a backpass of the circulating fluidized bed power plant; and introducing a quantity of lime into the flash dry absorber scrubber. In one exemplary embodiment the method includes introducing a quantity of limestone into a circulating fluidized bed boiler of the power plant. In one exemplary embodiment the method includes adjusting the quantity of lime introduced into the backpass of the circulating fluidized bed power plant and the quantity of limestone introduced into the circulating fluidized bed boiler of the circulating fluidized bed power plant to optimize a total cost of both the lime and the limestone. In one exemplary embodiment the introducing a quantity of lime into the flash dry absorber includes introducing a quantity of lime into the backpass of the circulating fluidized bed power plant upstream of the flash dry absorber scrubber.

BRIEF DESCRIPTION OF THE DRAWINGS

Referring now to the figures, which are exemplary embodiments, and wherein the like elements are numbered alike.

DETAILED DESCRIPTION

A system and method is provided for reducing circulating fluidized bed ("CFB") power plant sulfur dioxide ("$SO_2$") emissions. More particularly, the present disclosure relates to a system and method for enhancing the performance of a flash dry absorber ("FDA") scrubber in a power plant utilizing a CFB. The enhanced performance of the FDA scrubber enables a CFB power plant to produce at least substantially the same amount of $SO_2$ emissions or less as a conventional power plant, for example, while adding significantly less limestone to a boiler and thus at reduced cost, as will be discussed in detail below. However, the present invention is not limited thereto, and may be applied to any application wherein reduced $SO_2$ emissions are desirable.

Figure 1:
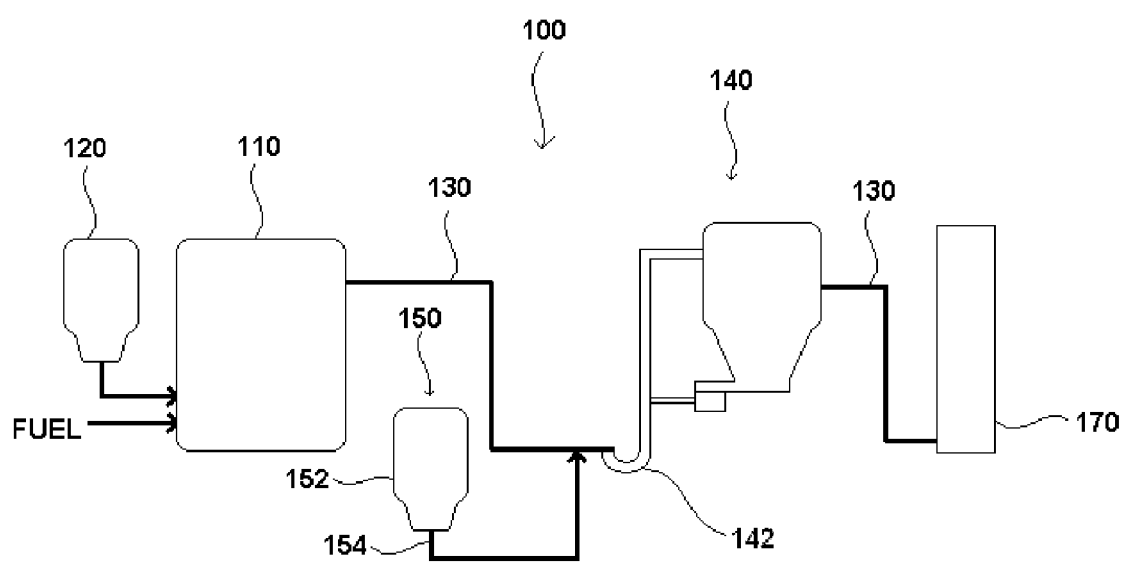
FIG. 1 is a schematic view of a power plant according to an exemplary embodiment of the present invention.

FIG. 1 is a schematic view of a CFB power plant according to an exemplary embodiment of the present invention. For simplicity, FIG. 1 depicts only those features of the CFB power plant that are relevant to describe the present invention, and it will be appreciated that the CFB power plant will include other features, as are well known in the art.

Figure 2:
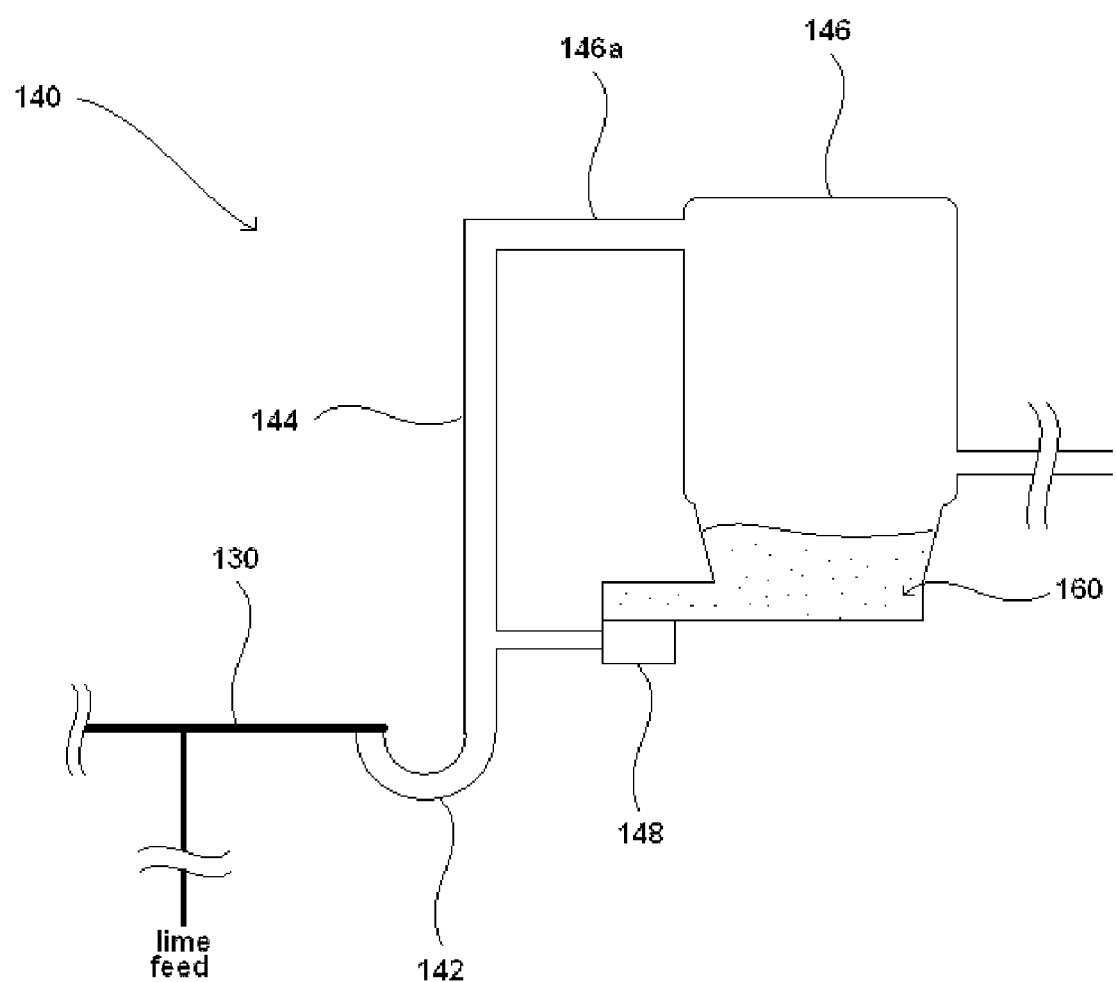
FIG. 2 is a schematic view of a flash dry absorber ("FDA") scrubber according to an exemplary embodiment of the present invention.

FIG. 2 is a schematic view of an FDA scrubber of the CFB power plant according to an exemplary embodiment of the present invention. For simplicity, the schematic of FIG. 2 depicts only those features of the FDA scrubber that are relevant to describe the present invention, and it will be appreciated that the FDA scrubber will include other features, as are well known in the art.

Referring now to FIG. 1, a CFB power plant 100 includes a CFB boiler 110 and a limestone feed 120. The CFB boiler 110 is supplied with fuel from a source (not shown), and is also supplied with limestone from the limestone feed 120. The limestone acts as an $SO_2$ sorbent in the CFB boiler 110 during combustion of the fuel, thereby reducing the total $SO_2$ in flue gases emitted from the CFB boiler 110 into the power plant backpass 130.

The flue gases may pass through various backpass 130 components such as cyclones, superheaters, etc. as would be apparent to one of ordinary skill in the art. Eventually, the flue gases pass into an FDA scrubber 140 through an FDA scrubber inlet duct 142.

However, unlike a conventional power plant utilizing an FDA scrubber, the flue gases are injected with dry hydrated lime from a lime feed 150. In one exemplary embodiment the flue gases are injected with dry hydrated lime before the flue gases enter the FDA scrubber inlet duct 142. The dry hydrated lime may be injected at a low feed rate, an example of which will be illustrated in more detail below. Because of the low feed rate, the dry hydrated lime may be purchased as a ready-to-use commodity requiring little or no on-site preparation. In the exemplary embodiment shown in FIG. 1, the lime feed 150 may comprise a day silo 152 and a pneumatic feed system 154. Alternative exemplary embodiments may use other configurations as would be known to one of ordinary skill in the art. The relative simplicity of the lime feed 150 allows it to be easily retrofitted to existing power plants where an FDA scrubber is already in use. Once combined, the flue gases and the injected dry hydrated lime then pass through the FDA scrubber inlet duct 142 together.

Referring now to FIG. 2, the FDA scrubber 140 includes a reactor 144, a particulate removal mechanism 146 and a mixer 148. The reactor 144 receives the flue gases and dry hydrated lime from the FDA scrubber inlet duct 142. The flue gases react with the dry hydrated lime in the reactor 144, wherein the dry hydrated lime acts as a sorbent to remove $SO_2$ from the flue gases. In one exemplary embodiment, the reactor 144 may be a column reactor 144, although other types of reactors may be employed as would be apparent to one of ordinary skill in the art.

The flue gases continue to react with the dry hydrated lime sorbent while they pass through a particulate removal mechanism inlet duct 146a and into the particulate removal mechanism 146. The particulate removal mechanism 146 removes particulate which is entrained in the flue gases; for the purposes discussed herein, the particulate may be ash, flyash, dust or any other particulate entrained in the flue gases. The removed particulate 160 then accumulates in the bottom of the particulate removal mechanism 146 as shown by the dotted region in FIG. 2.

One exemplary embodiment of the particulate removal mechanism 146 is a fabric filter. Another exemplary embodiment of the particulate removal mechanism 146 is an electrostatic precipitator. Alternative particulate removal systems may be employed as would be apparent to one of ordinary skill in the art.

The removed particulate 160 is then partially hydrated in a mixer 148 and injected through a mixer output port 148a into the reactor 144 to be recycled. The removed particulate 160 includes un-reacted dry hydrated lime from the lime feed 150 and calcium oxide ("CaO"), which is a byproduct of the combustion of limestone from the limestone feed 120 in the CFB boiler 110. Both the un-reacted dry hydrated lime and the CaO act as sorbents to remove $SO_2$ from the flue gases. In this manner, the efficiency of $SO_2$ removal in the FDA scrubber 140 may be increased. Referring again to FIG. 1, flue gases eventually pass through the FDA scrubber 140 and continue along an additional section of backpass 130 until the flue gases are emitted from a stack 170.

In an alternative exemplary embodiment, the dry hydrated lime may be added to the exhaust gases anywhere in the FDA scrubber 140, e.g., the dry hydrated lime may be added anywhere from the FDA scrubber inlet duct 142 to the particulate removal mechanism 146. Such alternative exemplary embodiments function in a similar manner to the exemplary embodiment described above, namely, the flue gases react with the dry hydrated lime which acts as a sorbent to remove $SO_2$ from the flue gases.

The increased $SO_2$ removal efficiency of the FDA scrubber 140 permits the CFB power plant 100 including the lime feed 150 to introduce significantly less limestone into the CFB boiler 110 while maintaining at least substantially the same or less emission of $SO_2$ as a conventional power plant. The efficiency of combustion in the CFB boiler 110 may be significantly increased due to the decrease in the amount of limestone introduced thereto; this is due to the lower calcination duty within the CFB boiler 110.

Although the cost of dry hydrated lime can be 5 to 8 times the cost of limestone, the overall improvement in FDA scrubber capture performance may result in a net reduction in the total sorbent cost, e.g., the cost of both limestone and dry hydrated lime, when compared to the limestone only case. By adjusting the relative amount of limestone and lime used, an optimized total sorbant cost may be established. An example illustrating the cost optimization concept follows below.

Example

Figure 3:
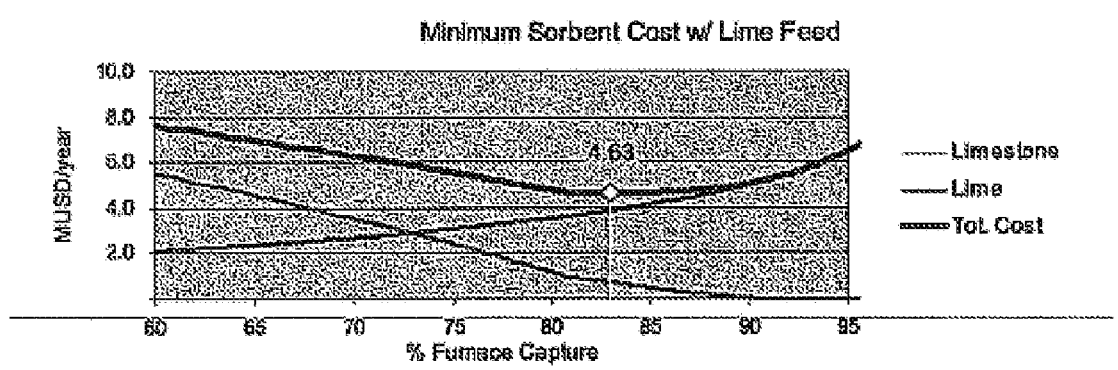
FIG. 3 is a graph illustrating adjustment of the relative feed rates of limestone and lime to meet a defined capture performance and minimum cost point according to an exemplary embodiment of the present invention.

The tables below and the graph depicted in FIG. 3, show an economic comparison between a conventional power plant utilizing an FDA scrubber and a CFB power plant utilizing an FDA scrubber and a lime feed according to an exemplary embodiment of the present invention. The baseline conditions for this example are listed in Table 1 below.

TABLE 1

| Metric | Value | Unit |
|---|---|---|
| Fuel Inputs for | | Example Contract |
| HHV | 10400 | Btu/lb |
| C | 53.48 | % |
| V | 4.40 | % |
| O | 7.21 | % |
| N | .90 | % |
| S | 4.50 | % |
| Ash | 20.00 | % |
| Moisture | 9.51 | % |
| Total Sorbants | 100.00 | % |
| Limestone | 90.0 | % $CaCO_3$ |
| Lime | 100.00 | % $Ca(OH)_2$ |
| Financial Inputs | | |
| Price for Limestone | $ | $/ton |
| Price for Lime | $ | $/ton |
| Disposal Cost | $ | $/ton |
| Fuel Cost | $ | $/mbtu |
| $CO_2$ Cost | $ | $/ton |
| Include Impact of $CO_2$ | No | (Y/N) |
| Disc. Rate | 8.0% | % |
| Inflation Rate | 3.0% | Years |
| Additional capital costs | 20 | |
| | $ | SM |
| Emission Inputs | | |
| Total Sulfur Removal | 98.00 | % |
| Stack O2 | 3.00 | % |
| Q Fired | 2501 | Mbtu/hr |
| Lb Fuel/mbtu | 96.15 | lbs |
| Fuel Fired | 240,481 | lbs/hr |
| F Factor | 9,348 | DSCFMBtu |
| ash/mbtu | 47.1 | lbs |
| Uncontrolled SO2 | 8.65 | lbs/mbtu |
| " | 4774 | ppm |
| " | 21,622 | lb/hr |
| SO2 at Stack | 0.17 | lbs/mbtu |
| " | 95 | ppm |
| " | 432 | lb/hr |
| " | 1,894 | Tons/year |
| Design Inputs | | |
| % Fly Ash Split | 50.0 | % |
| Furnace Util. Limit | 60.0 | % |
| FA Calcium Util. Limit | 70 | % |
| MW SO2 | 64.07 | |
| MW Ca(OH) | 74.09 | |
| MW CaCO3 | 100.09 | |
| MW CaO | 56.08 | |
| $K_{limestone}$ | 1.10 | |
| FDA | | |
| FA Removal Rate | 300 | ppm |
| FA Removal per ash correction | 300 | ppm |

Referring now to the graph illustrated in FIG. 3 and Table 2, the graph and table show how adjusting the relative feed rates of the limestone and lime in the present invention to meet a defined $SO_2$ capture performance can result in a minimum cost point. For the example shown below, with respect to Table 2, the minimum cost point of the total sorbant for the exemplary embodiment of the present invention is about 14% lower than the total sorbant cost of the conventional power plant at the same $SO_2$ capture performance.

TABLE 2

| | Power plant with conventional FDA scrubber | Power plant according to the present invention | Delta | Units |
|---|---|---|---|---|
| Limestone consumption | 76,831 | 55,766 | 21,066 | Lbs/hour |
| Limestone cost | 5,384,348 | 3,908,073 | 1,476,275 | $/year |
| Lime consumption | 0 | 1,947 | 1,947 | Lbs/hour |
| Lime cost | 0 | 724,917 | 724,917 | $/year |
| Total sorbent costs | 5,384,348 | 4,632,991 | 751,358 (total sorbent savings of 14%) | $/year |

As shown above, the CFB power plant 100 according to an embodiment of the present invention utilizes 1,947 lbs/hour more lime than the conventional power plant for an additional cost of about $724,917 per year. However, the use of the lime feed 150 in the exemplary embodiment of the present invention allows the CFB boiler 110 to operate using only 55,766 lbs. of limestone per hour to meet the same $SO_2$ capture rate as the conventional power plant using 76,831 lbs. of limestone an hour. The exemplary embodiment of a CFB power plant according to the present invention therefore uses 21,066 lbs. per hour less limestone than the conventional power plant. This results in a cost savings for limestone of about $1,476,275 per year. Therefore, even though the addition of lime represents an additional cost, the savings in reduced limestone usage outweighs that cost.

As shown in FIG. 3, the total cost of the combined limestone and lime sorbents is a sum of the individual sorbent costs. To meet a furnace capture percentage of approximately 83%, the CFB power plant according to an exemplary embodiment of the present invention uses approximately $724,917/year of lime and approximately $3,908,073/year of limestone.

In addition to the cost optimization discussed above, the present invention may also achieve additional operating cost savings. The CFB power plant 100 may realize reductions in fuel use due to increased combustion efficiency in the CFB boiler 110 because of the reduced amount of limestone introduced therein. The increased combustion efficiency may also lead to other benefits such as reduced carbon dioxide ("$CO_2$") emissions, a reduction in the total particulate produced in the CFB boiler 110 and a reduction in the catalytic generation of nitrogen oxide ("NOx"), which in turn, will improve NOx emissions and/or reduce the need for NOx removal systems.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A circulating fluidized bed power plant comprising:
   a circulating fluidized bed boiler which generates flue gases;
   a flash dry absorber scrubber configured to receive the flue gases from the circulating fluidized bed boiler; and
   a lime feed configured to introduce lime into the flash dry absorber scrubber.

2. The circulating fluidized bed power plant of claim 1, further comprising:
   a limestone feed configured to introduce limestone to the circulating fluidized bed boiler.

3. The circulating fluidized bed power plant of claim 2, wherein the lime is introduced into the flash dry absorber scrubber at a feed rate to optimize cost use of limestone and lime.

4. The circulating fluidized bed power plant of claim 1, wherein the flash dry absorber scrubber comprises:
   a reactor configured to pass the flue gases therethrough;
   a particulate removal mechanism coupled to the reactor and configured to remove particulate from the flue gases; and
   a mixer configured to receive and hydrate particulate from the particulate removal mechanism and also configured to introduce hydrated particulate into the reactor.

5. The circulating fluidized bed power plant of claim 4, wherein the lime feed is configured to introduce lime into the flash dry absorber scrubber upstream of the introduction of the hydrated particulate.

6. The circulating fluidized bed power plant of claim 4, wherein the particulate removal mechanism includes a fabric filter.

7. The circulating fluidized bed power plant of claim 4, wherein the particulate removal mechanism includes an electrostatic precipitator.

8. The circulating fluidized bed power plant of claim 4, further comprising a flash dry absorber scrubber inlet duct disposed between the circulating fluidized bed boiler and the reactor.

9. The circulating fluidized bed power plant of claim 8, wherein the lime feed is configured to introduce lime upstream of the flash dry absorber scrubber inlet duct.

10. The circulating fluidized bed power plant of claim 4, further comprising a particulate removal mechanism inlet duct disposed between the reactor and the particulate removal mechanism.

11. The circulating fluidized bed power plant of claim 10, wherein the reactor is disposed between the flash dry absorber scrubber inlet duct and the particulate removal mechanism inlet duct.

12. The circulating fluidized bed power plant of claim 4, wherein the reactor is a column reactor.

13. The circulating fluidized bed power plant of claim 1, wherein the lime feed comprises:
    a day silo configured to hold the lime; and
    a pneumatic feed receiving lime from the day silo and configured to introduce the lime into the flash dry absorber scrubber.

14. A method for reducing sulfur dioxide emission from a circulating fluidized bed power plant, the method comprising:
    providing a flash dry absorber scrubber in a backpass of the circulating fluidized bed power plant; and
    introducing a quantity of lime into the flash dry absorber scrubber.

15. The method of claim 14, further comprising introducing a quantity of limestone into a circulating fluidized bed boiler of the power plant.

16. The method of claim 14, further comprising adjusting the quantity of lime introduced into the backpass of the circulating fluidized bed power plant and the quantity of limestone introduced into the circulating fluidized bed boiler of the circulating fluidized bed power plant to optimize a total cost of both the lime and the limestone.

17. The method of claim 14, wherein the introducing a quantity of lime into the flash dry absorber scrubber comprises introducing a quantity of lime into the backpass of the circulating fluidized bed power plant upstream of the flash dry absorber scrubber.

* * * * *